United States Patent [19]
Barnett

[11] 3,888,617
[45] June 10, 1975

[54] APPARATUS FOR FORMING MULTIPLE PASSAGEWAY CONDUIT

[76] Inventor: Louis H. Barnett, 3631 Encanto Dr., Fort Worth, Tex. 76109

[22] Filed: July 24, 1973

[21] Appl. No.: 382,142

Related U.S. Application Data

[62] Division of Ser. Nos. 149,910, June 4, 1971, abandoned, and Ser. No. 273,359, , Pat. No. 3,825,641.

[52] U.S. Cl............. 425/296; 425/326 R; 425/380
[51] Int. Cl................................................. B29f 3/04
[58] Field of Search......... 425/71, 296, 308, 326 R, 425/380, 461, 467, 142; 264/150, 151, 177 R, 89, 209, 237

[56] References Cited
UNITED STATES PATENTS

| 1,679,427 | 8/1928 | Jewell | 285/137 R |
| 1,785,457 | 12/1930 | Pfohl | 425/71 X |
| 3,032,870 | 5/1962 | Rohrberg et al. | 285/332 X |
| 3,212,135 | 10/1965 | Branscum | 425/326 R |
| 3,274,315 | 9/1966 | Kawamura | 425/326 R X |
| 3,402,682 | 9/1968 | Peden et al. | 425/380 X |
| 3,538,595 | 11/1970 | Barnes | 264/150 X |
| 3,539,670 | 11/1970 | Hall | 425/71 X |
| 3,732,046 | 5/1973 | Martin et al. | 425/71 X |
| 3,778,217 | 11/1973 | Bustamante et al. | 425/467 |

FOREIGN PATENTS OR APPLICATIONS

| 620,278 | 3/1961 | Italy | 425/380 |
| 45-36020 | 11/1970 | Japan | 425/326 R |

*Primary Examiner*—R. Spencer Annear
*Attorney, Agent, or Firm*—Wofford, Felsman, Fails & Zobal

[57] ABSTRACT

Apparatus for forming conduit having a plurality of longitudinally extending passageways disposed adjacent each other within an exterior wall, the passageways having at least a portion of their interior walls in common with adjacent passageways. The apparatus is characterized by blender and extruder having a hopper, plasticizer and die that includes a plurality of pins with at least one completely surrounded by others, and, in specific embodiments, stingers for supporting and preventing distortion of the pliable walls of hot extrudate until cooled sufficiently; cooling, sizing and vacuum chamber for cooling and sizing and including a support for the exterior wall; and pullers, track, and cutting saws.

7 Claims, 18 Drawing Figures

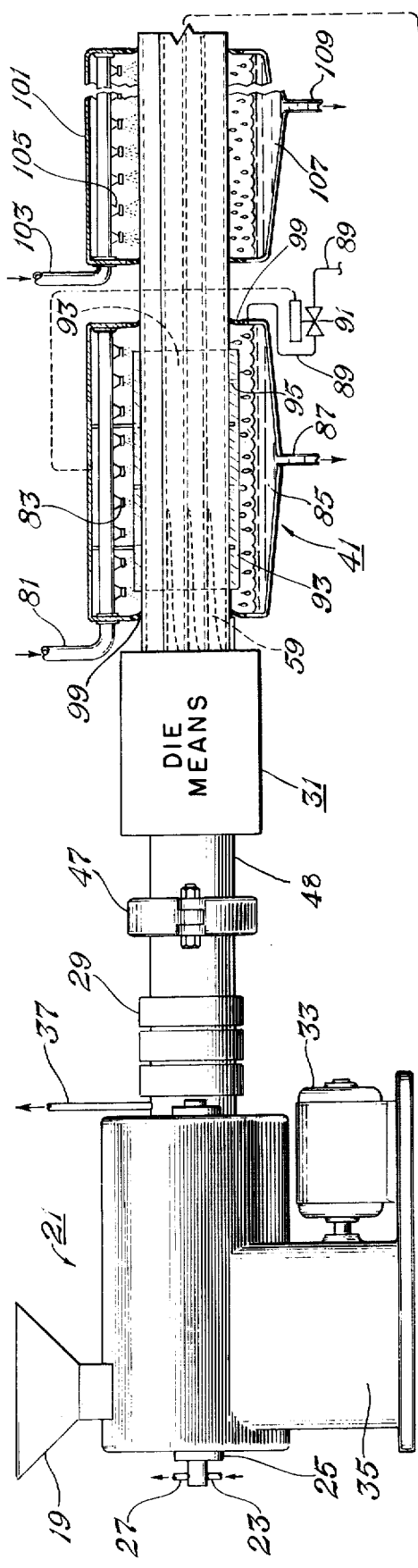
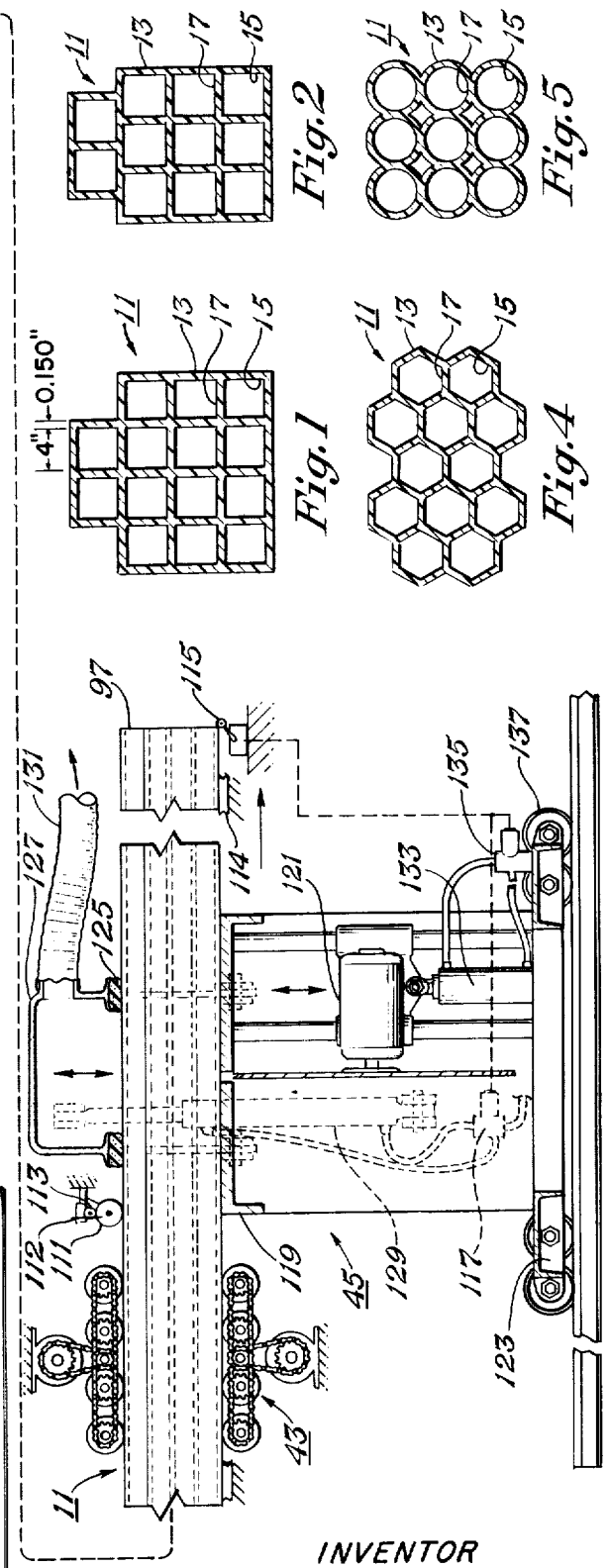

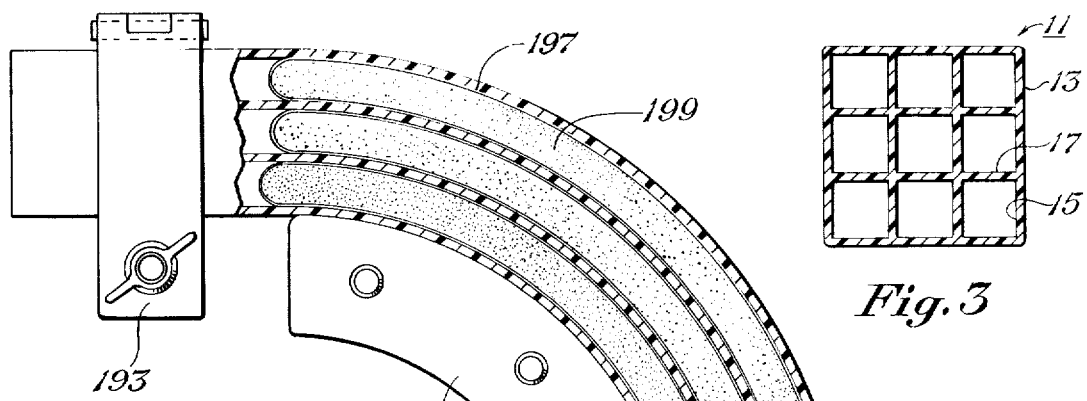
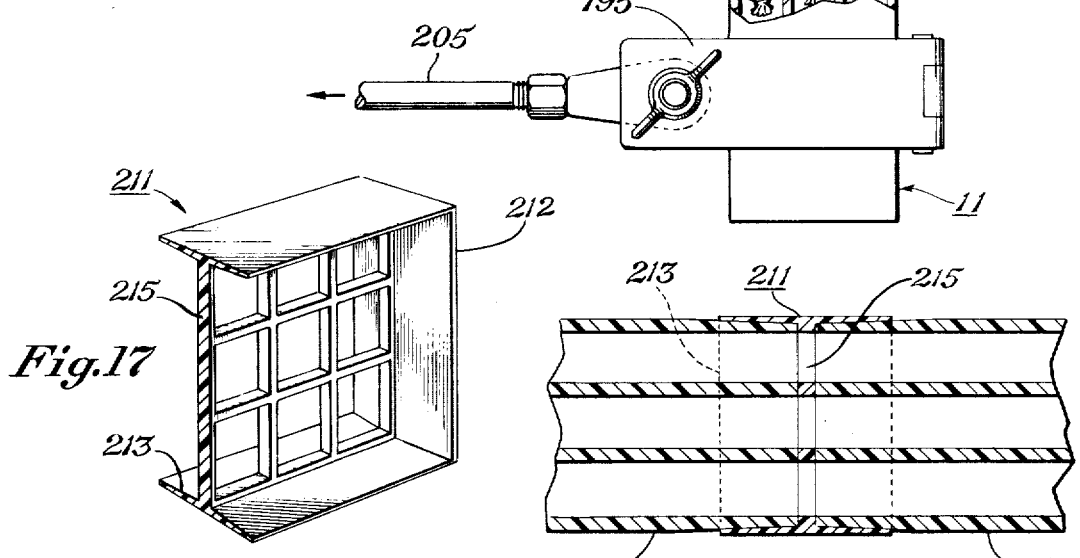
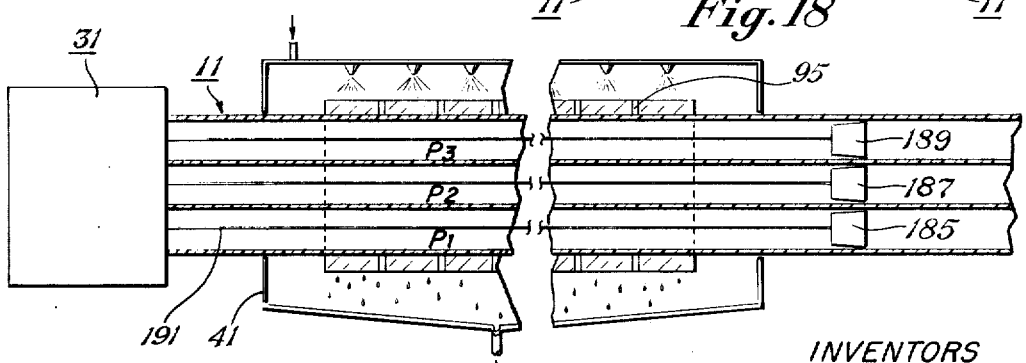

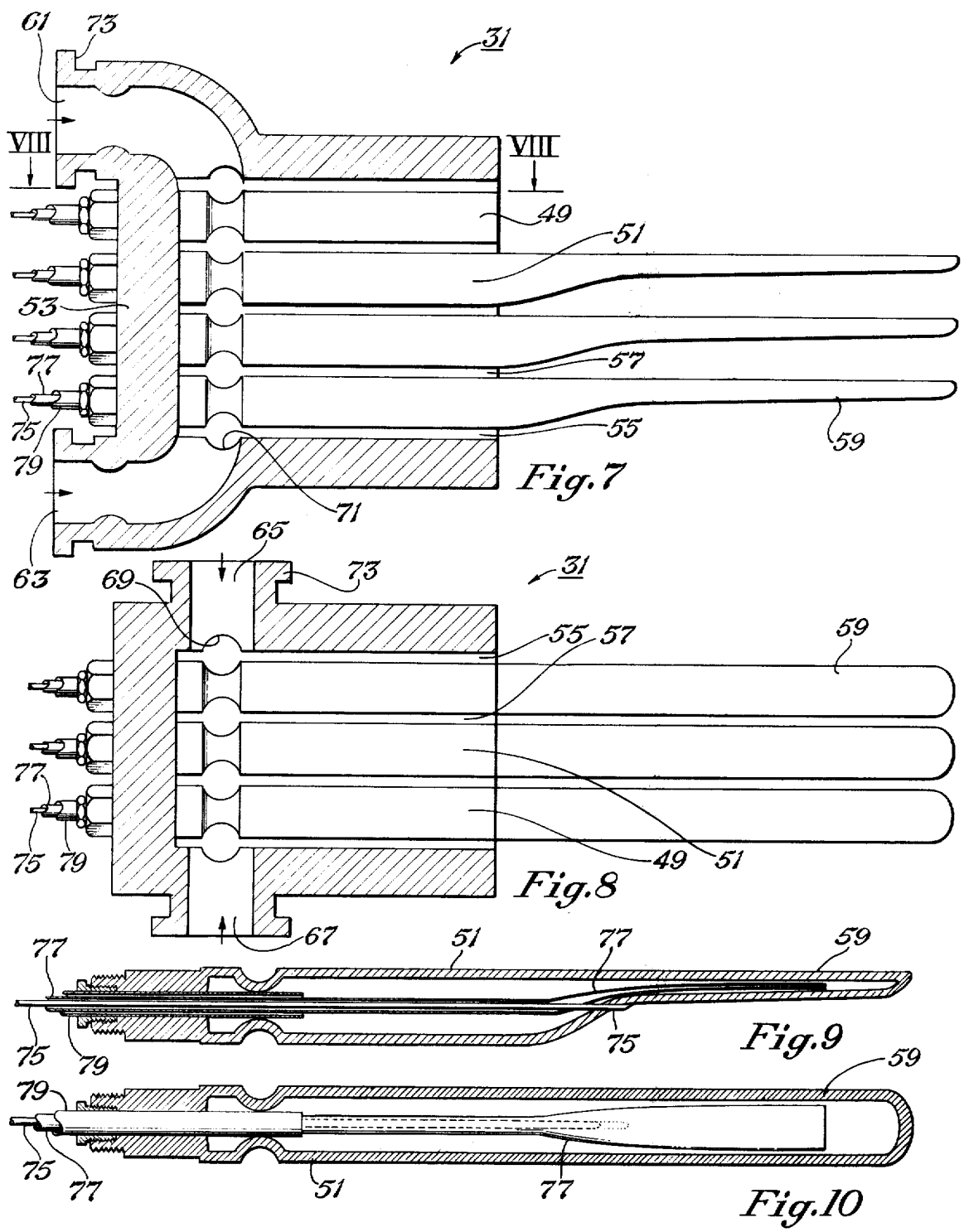

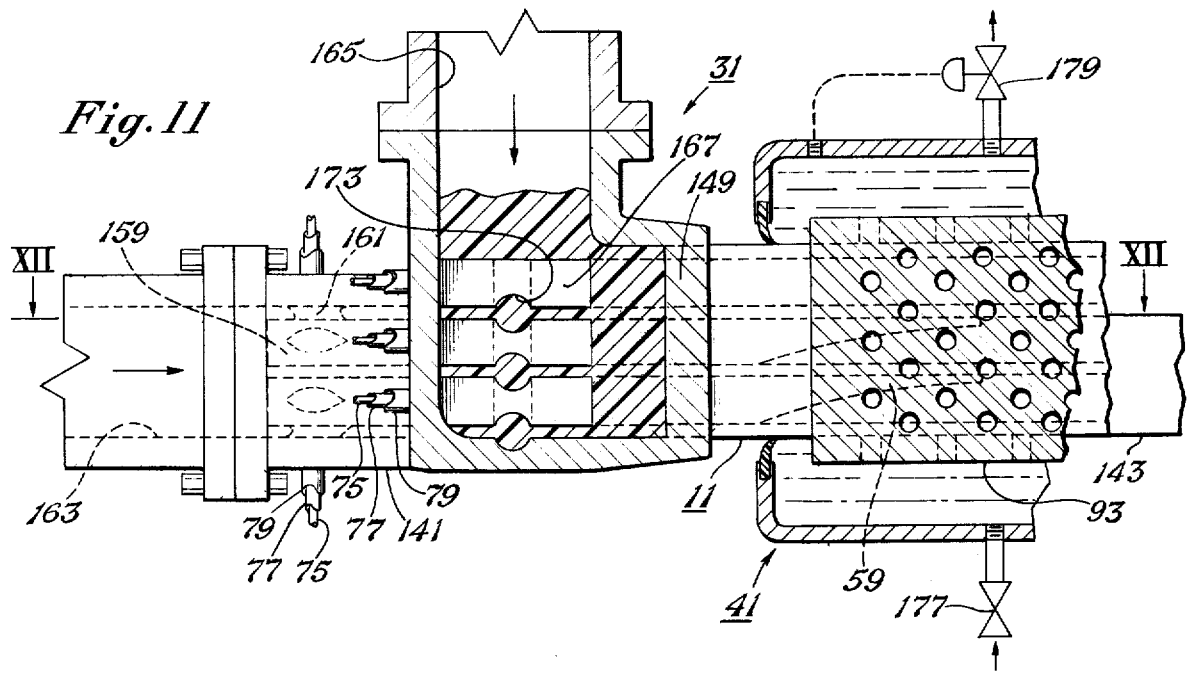
Fig. 11
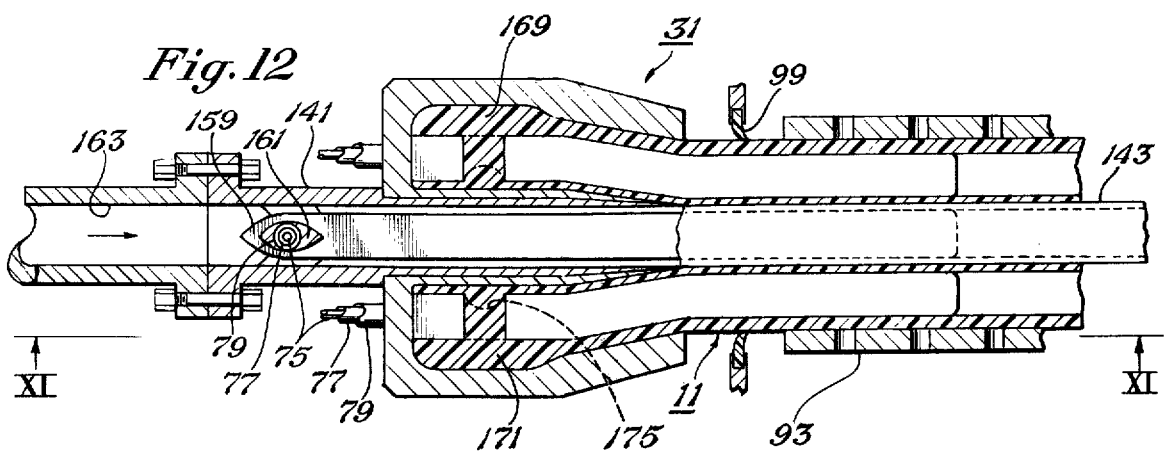
Fig. 12
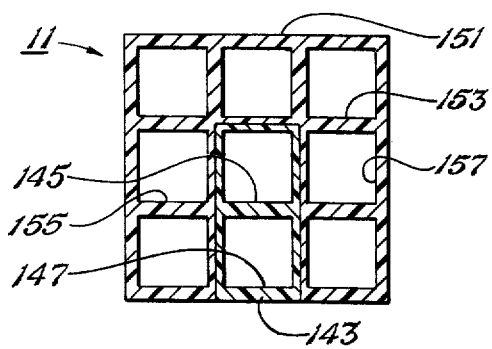
Fig. 13
Fig. 14
INVENTOR
Louis H. Barnett
BY
Wofford, Felsman & Fails
ATTORNEYS

APPARATUS FOR FORMING MULTIPLE PASSAGEWAY CONDUIT

This is a division of application ser. No. 149,910, filed, June 4, 1971, now abandoned, and Ser. No. 273,359, filed July 20, 1972, now U.S. Pat. No. 3,825,641.

BACKGROUND OF THE INVENTION

1. Field of the Invention

This invention relates to pipe; and, more particularly, it relates to conduit means having a plurality of longitudinally extending passageways.

2. Description of the Prior Art

Conduit means, or pipe, has been used for wide variety of purposes. One fairly recent innovation that has increased with the advent of underground utilities has been the short sections of concrete pipe having a plurality of longitudinally extending passageways. The concrete sections had to be short, since they were so difficult to handle. They were heavy, frangible in the sense of being easily broken when dropped, expensive and inflexible; and were laboriously joined together because of the large number of joints required to join the short sections. Moreover, each of the joints required hand application of an adhesive material to join the sections, further adding to the expense of the installation. Also, the concrete pipe sections were relatively costly to form.

Because of these disadvantages, there has been a more recent increased use of single passageway plastic pipe to replace the concrete, because of the obvious advantages of the longer lengths of the lightweight and less costly pipes; and the less expensive installation. When a plurality of longitudinally extending passageways were desired, the plastic pipes were assembled, or banded together, to form bundles. Although advantageous, these bundles were costly to assemble and were difficult to install, particularly when joining together longitudinally or making turns, as by elbows; commonly called sweeps.

BRIEF DESCRIPTION OF THE DRAWINGS

FIGS. 1–5 are cross sectional views of different conduit means having a respective plurality of longitudinally extending passageways in accordance with respective embodiments of this invention.

FIG. 6 is a side elevational view, partly in section and partly schematic, of apparatus for manufacturing the conduit means of this invention.

FIG. 7 is a side elevational cross sectional view of one embodiment of a die head means for extruding the conduit means of this invention.

FIG. 8 is a top cross sectional view taken along the line VIII–VIII of the die head means of FIG. 7.

FIG. 9 is a side elevational view, mostly in section, of one of the stingers employed in the embodiment of FIG. 7.

FIG. 10 is a top plan view, mostly in section, of the stinger of FIG. 9.

FIG. 11 is a side elevational view, partly in section and partly schematic, illustrating another embodiment of this invention employing a dual cross head die for extrusion of the conduit in two parts which are then joined together while the contiguous walls are still hot.

FIG. 12 is a top plan view, partly in section, taken along the lines XII—XII of FIG. 11.

FIG. 13 is an end cross sectional view of the dual extrudate forming the conduit as the contiguous walls are being joined, in accordance with the embodiment of FIG. 11.

FIG. 14 is an end cross sectional view of another embodiment of this invention in which dual cross head dies are employed to form a dual extrudate which is joined together to form the unitary conduit.

FIG. 15 is a partial cross sectional view, partly schematic, illustrating another method for forming the conduit means of this invention by employing different pressures within the respective longitudinally extending passageways of the conduit means, in accordance with another embodiment of this invention.

FIG. 16 is a plan view, partly cutaway and sectioned, illustrating the formation of an elbow in accordance with one embodiment of this invention.

FIG. 17 is an isometric view, partly cutaway and sectioned, illustrating a coupling means for joining sections of the conduit means in accordance with one embodiment of this invention.

FIG. 18 is a plan view in section of the coupling means of FIG. 17 being employed to join sections of conduit.

DESCRIPTION OF PREFERRED EMBODIMENTS

It is an object of this invention to provide apparatus for mating lightweight pipe having a plurality of longitudinally extending passageways that can be made and readily handled and employed in long sections and that obviates the disadvantages of the prior art structure in assembly and installation. It is also an object of this invention to provide apparatus for production of the lightweight pipe having the plurality of longitudinally extending passageways by an automated extrusion process that keeps costs low.

These and other objects will be apparent when taken in conjunction with the following descriptive matter and the attached drawings.

In accordance with one embodiment of this invention, there is provided pipe, or conduit means, such as illustrated in FIGS. 1–5. Therein, the conduit means 11 has an exterior wall 13 that is formed of an extrudable plastic. A plurality of passageways 15 extending longitudinally of the conduit means 11, are disposed adjacent each other and within the exterior wall 13. The passageways 15 have at least a portion of their interior walls 17, that are not formed by the exterior wall, in common with an adjacent passageway. The interior walls 17 are also formed of an extrudable plastic.

The plurality of passageways may comprise only a pair of adjacent passageways, or it may comprise any desired number; such as, 9, FIG. 3 and FIG. 5; 11, FIG. 2; 12, FIG. 4; 14, FIG. 1; or any other desired number. Moreover, the passageways may be circular in cross sectional shape, as illustrated in FIG. 5, or they may be defined by a plurality of substantially flat sides; such as, the square sides of FIGS. 1–3, or the hexagonally shaped passageways illustrated in FIG. 4. Any other shape may be employed if desired.

One particularly advantageous aspect of an embodiment of this invention is that the conduit means having the plurality of longitudinally extending passageways may be produced continuously by an extrusion method to produce the conduit means economically. Basically, the method comprises the following steps. First, a molten plastic is extruded through a die means having a plurality of adjacent pin means that are spaced apart so as to define a continuous extrusion passageway around the respective pin means. In this way the extrusion passageway forms a hot extrudate that is continuous and closed in cross section and that defines a plurality of longitudinally extending passageways, each passageway having at least a portion of its interior, or internal, wall in common with an adjacent passageway. Second, the hot extrudate is cooled while simultaneously sizing it and effecting a pressure on the interior of the hot extrudate that is higher than the pressure on the exterior of the extrudate. External support structure is employed to size and support the exterior walls of the extrudate to prevent distortion of the exterior walls under the force of gravity and the differential pressure from the interior to the exterior of the extrudate until the extrudate is cool enough to resist such distortion. The interior walls may be supported by stinger means on the respective pin means for the interior walls, or by a differential pressure, as will become more apparent hereinafter. Third, the extrudate is further cooled to the conduit means in a non-pliable state. Fourth, the cooled extrudate, or conduit means, is pulled outwardly so as to effect movement of the extrudate away from the die means. Finally, the conduit means is cut into sections of predetermined length by a saw means that effects an exactly square cut; that is, a cut that is perpendicular to the longitudinal axis of the conduit means.

The conduit means may be formed from any of the extrudable thermoplastic materials. These thermoplastic materials include the economical polymers such as poly vinyl chloride (PVC); polystyrene, the polyolefinic polymers like high density polyethylene and polypropylene; and the more expensive but more easily workable copolymers such as acrylonitrile butadiene styrene copolymer (ABS). The raw ingredients which are fed into the apparatus include, in addition to the thermoplastic material, a lubricant; such as, hydrocarbonaceous material like paraffin; that is comminuted to fine particles and added to the thermoplastic material for lubricating the dies, the pins, and the bushings, defining the annular space through which the plastic extrudate will be extruded. Also included is a conventional commerical modifier for adding impact resistance. The modifier may be a rubber type compound to prevent brittleness and increase the tensile strength of the pipe, particularly where PVC is employed, since the PVC alone is very brittle. In addition, the appearance of the pipe is improved, and its resistance to degradation; for example, degradation in the presence of the ultraviolet light component of the sunlight; is improved by the addition of a pigment such as titanium dioxide and carbon black. Moreover, progress is being made in the use of inert additives such as calcium carbonate to add bulk without detrimentally affecting the properties of the conduit. The technology of the various materials which are employed has been well developed in the production of single passageway plastic pipe, particularly in the United States where the sophisticated chemicals were employed to compensate for mechanical equipment that was not as refined as that employed in other parts of the world.

Apparatus for effecting the method of extruding the conduit means having the plurality of longitudinally extending passageways is illustrated in FIG. 6. Therein, the apparatus comprises the major elements and assemblies of a blender and extruder means 21, cooling and sizing chamber means 41, pulling means 43, and square cutting means 45.

A hopper 19 is provided for feeding the pre-blended feed material; such as, the polymer, lubricant, and modifier; to the blender and extruder means 21. The blender and extruder means 21 may comprise a single screw type or a multiple screw type. Both types of blender and extruder means have been employed in extruding single passageway conduit. Before this invention, however, engineers have considered the extrusion of the more complex multiple-passageway conduit impractical, primarily because of the difficulties with supporting and cooling the internal walls, which is described in detail hereinafter. The blender and extruder means 21 have, or can be modified to have, the requisite flexibility to extrude multiple-passageway conduit. As illustrated, the blender and extruder means 21 has therewithin a plasticizer means for converting the feed material into a viscous molten mass and is of the multiple screw type. Preferably, for flexibility, the plasticizer means comprises a plurality of heated screws, or augers, for kneading and heating the feed material to its molten temperature and mixing thoroughly. The blender and extruder means 21 has a set of back screws that, as illustrated, are heated by a circulation of hot oil through an inlet conduit 23 and universal coupling 25. The hot oil passes outwardly through an effluent conduit 27. A hot oil source is conventionally available in such extrusion plants and need not be described in detail herein. If desired, the back screws may be heated electrically by conventionally employed electrical conductors, brushers, and slip rings. The back screws comprise a counter rotating pair of screws for mixing the feed material to almost extrudable form, then dropping it vertically into the front set or sets of counter rotating screws for effecting a cooler molten extrudate that is more readily flowable for effecting complicated extrusion profiles with better results. The forward set of screws comprise two or more sets of counter rotating screws that develop a high positive pressure for feeding the plastic through the heating means such as the electrical heaters 239 and the die means 31.

The respective sets of screws are powered by a suitable motor 33 acting through suitable drive means within the base support 35 of the blender and extruder means 21. Regardless of whether one or more screws are employed, they are driven by adjustable drives; such as, the conventionally employed "Dynamatic" drive; for variable speed control and the requisite flexibility. Since these drive means are conventional, they are not shown. Suitable blender and extruder means with the desired adjustable drive means are commercially available from domestic and international manufacturers.

In addition to the adjustment of the drive means, suitable speed control means and temperature control means are employed; and are housed in an air conditioned room separate from the heated screws in the blender and extruder means 21. Desirably, the control room containing the temperature and speed controls will be locked, to prevent adjustment of the respective temperature and speed by each shift of employees, for producing more nearly uniform conduit means.

A conduit means 37 is connected with a vaccum source for drawing air out of the powdered feed materials which are added in hopper 19.

The die means 31 is firmly, but removably attached to the remainder of the blender and extruder means 21, as by strong retention ring 47, alone, or in conjunction with additional flanges on parts of the die means, as will become apparent hereinafter. FIG. 7 illustrates a side elevational, cross sectional view of one embodiment of the die means 31. A plurality of pin means such as pins 49 and 51 are cantilevered from a strong spider 53 and are disposed so as to define a plurality of extrusion passageways 55 and 57 for extrusion of the exterior and interior walls of the conduit means. The number and cross sectional shape of the respective pin means are, of course, designed to effect the number and cross sectional shape of the longitudinally extending passageways of the conduit means. The strong spider 53 must be able to retain the respective pin means in place against the relatively high force created by the differential pressure tending to force the pin means outwardly. Each of the respective pin means which supports in interior wall of the conduit that is subject to deformation under the force of gravity has a stinger 59 to support the wall as it is being cooled to a temperature to resist deformation under the force of gravity. The stinger 59 is cantilevered from the respective pin to effect the desired support of such interior walls. Such interior walls are typified by horizontal interior wall 17, FIG. 1.

FIG. 8 is a plan view along the lines VIII - VIII of FIG. 7 showing the respective pin means, 49 and 51; extrusion passageways 55 and 57, and stinger 59. As illustrated in FIGS. 7 and 8, there are a plurality of inlet passageways 61, 63, 65, and 67 disposed respectively at the top, bottom and sides of the die means 31 for effecting a more nearly even distribution of the difficultly flowable molten plastic feed materials to the respective extrusion passageways. Moreover, vertical and horizontal flow passageways 69 and 71 are defined by recesses in the respective pin means to facilitate achieving a more nearly uniform distribution of the plastic material to be extruded through the respective extrusion passageways. Even with the liberal flow passageways, a pressure of up to 1,500 – 2,000 pounds per square inch may be required to be supplied by the screws in the blender and extruder means 21 to achieve the desired distribution of the plastic such that no interfaces are formed as the molten plastic material joins and flows through the respective extrustion passageways. The die means 31; having the extrusion passageways, the pins, and the inlet passageways; is affixed to the remainder of the blender and extruder means 21 by suitable flange means such as flanges 73. For example, the conduit means 48, FIG. 1, may have at one end flange means to mate with the flanges 73 and at the other end flange means to fit within retention ring 47; in order to facilitate disassembly. The flanges on the die means 31 and the conduit means 48 may be fastened together by any of the conventional fastening means; such as, stud bolts and nuts through apertures, or U clamps having bolts therein. FIGS. 9 and 10 are side and top cross sectional views showing more details of construction of the pin means such as pins 51. As illustrated in FIGS. 7–10, a central passageway is defined; for example, by conduit means 75; for passage of a first cooling fluid centrally through the pin means and into the interior of respective longitudinally extending passageways of the conduit means that is extruded through the die means 31. The first cooling fluid may comprise any chilled, readily flowable fluid, but preferably comprises a gaseous fluid that does not tend to distort the interior walls of the conduit means. For example, chilled air is a particularly preferred fluid for reasons of economy. A second annular passageway is defined by a second conduit means 77 for passage of a second cooling fluid into the interior of the pin means 51. As can be seen in FIGS. 9 and 10, the second conduit means 77 extends to the closed end of the stinger 59, when one is used on the pin means, to pass the second cooling fluid completely through the stinger 59. A third passageway such as defined by third conduit means 79 affords an effluent passageway for passage of the second cooling fluid outwardly from within the stinger 59. The second cooling fluid may comprise chilled air, or chilled oil, or any other similar cooled, readily flowable fluid. The oils which are employed as a cooling fluid should have a boiling point above the softening temperature of the plastic, which may be as high as 300°–350°F. Because of this relatively high temperature, water is not preferred as a cooling fluid; since it tends to turn rapidly to steam, with attendant pressure increase and thermal shock to the equipment. Water does afford a highly effective heat transfer fluid, however, since it absorbes its latent heat of evaporation and may be effective with certain embodiments such as the stainless steels which can survive the thermal shock. Similarly, the short pins 49 have the same first cooling fluid flowing centrally therethrough and the circulation of the second cooling fluid into and from them. The stinger 59 must be structurally strong, yet readily pass heat from the hot plastic extrudate inwardly to the second cooling fluid being circulated within the stinger 59 and the pin means 51. This requirement is best met by employing alloys such as stainless steel in making the pin means. Alloys other than stainless steel may be employed in certain instances. For example, when the plastic is a readily flowable plastic such as ABS, the pin means may be formed of material having less structural strength; for example, alloys of copper or aluminum. On the other hand, high structural strength alloys such as titanium and chromium alloys may be employed if desired.

While concentric passageways and conduits 75, 77, and 79 are illustrated, the passageways may be otherwise formed and located, as long as the required cooling and supplying of pressure is effected.

Suitable die means employing the design delineated herein may be fabricated or ordered special from domestic and international manufacturers.

Referring to FIG. 6, the hot extrudate is extruded from the die means in the form of exterior and interior walls thhat are continuous in cross section and that define the plurality of longitudinally extending passageways. The hot extrudate passes into the cooling and sizing means 41. The hot extrudate is in the form of a soft, shaped conduit means. The respective stingers 59 extend inwardly into the cooling and sizing means 41 for support of the interior walls, since they are otherwise subject to distortion as noted hereinbefore. As illustrated, the cooling and sizing means 41 also comprises a vacuum chamber. Specifically, a chilled cooling fluid such as chilled water is sprayed into the interior of the cooling and sizing means 41 via conduit 81 and spray heads 83 for rapidly chilling the exterior walls. The chilled water is maintained at about 55° in a conventional refrigeration assembly in conventional plants manufacturing single passageway plastic pipe. Such conventional refrigeration assemblies need not be described herein. The accumulated liquid such as water 85 is withdrawn from the bottom of the cooling and sizing means 41 via conduit 87 connected with suitable vacuum pump (not shown). The level of the water 85 is maintained by conventional liquid level controller which, in turn, operates the vacuum pump (not shown). In addition, the partial vacuum is controlled via suitable conduit 89, and vacuum regulator 91. The conduit 89, downstream of the vacuum regulator 91, is connected with a suitable gaseous vacuum pump to maintain the vacuum on the interior of the cooling and sizing means 41. The vacuum is maintained by suitable flexible closure means 99 at each end of the cooling and sizing means 41 to prevent influx of large quantities of air which would destroy the partial vacuum therewithin.

Suitable perforated plate support means 93 are provided for sizing the external dimensions of the conduit means being extruded. Expressed otherwise, the perforated support plate means 93 are placed so as to define exactly the external dimensions of the conduit means. The perforations 95 extending through the support means 93 allow the exterior walls of the conduit means to be forced closely contiguous the interior surfaces of the support means 93 by the atmospheric pressure on the interior of the longitudinally extending passageways acting against the partial vacuum on the interior of the sizing and cooling means 41. In fact, the cooling fluid supplied to the interior of the longitudinally extending passageways through conduit means 75 creates a positive pressure which is slightly above atmospheric, although the open ends 97 of the respective passageways are open to atmospheric pressure. Thus, it can be seen that the cooling fluid flowing centrally through conduit 75 and through the interior of the longitudinally extending passageways, also serves to effect a pressure differential across the exterior walls of the conduit means 11.

The described cooling and sizing means 41 is similar to a spray type conventionally employed in extrusion of single passageway conduit. If desired, the cooling and sizing means 41 may be similar to another type also employed in cooling and sizing single passageway conduit. For example, it may comprise a container filled with a chilled liquid, having a restricted inlet of the chilled liquid such as chilled water and having the desired vacuum maintained by a suction pump pumping the liquid therefrom.

The cooling is rapid within the cooling and sizing means 41, so the hot extrudate is quickly formed into the desired, self-sustaining shape of the conduit means having the plurality of longitudinally extending passageways. If desired, however, a second cooling means such as cooling chamber 101 may be employed. As illustrated, cooling chamber 101 employs chilled water fed by suitable conduit 103 and spray heads 105 for cooling the conduit means 11 completely. The accumulated water 107 is drained via suitable conduit 109 connected with a pump (not shown). The pump may be operated by suitable liquid level controller (not shown). The cooling chamber 101 is not maintained at a vacuum, since the conduit means will have been cooled to a temperature where it is self-supporting, and both its interior and exterior walls resist deformation.

The conduit means 11 is pulled outwardly at a constant speed by the pulling means 43. Pulling means 43 is similar to the pullers conventionally employed in the extrusion of single passageway conduit; such as, those employing friction belts interposed on respective sides of the conduit means; or, as illustrated, those employing a plurality of groups of wheels having a resilient covering. In any event, the engaging surfaces; such as, belt or the resilient covering; and the adjustable dimension therebetween are adapted for accommodating the respective size and shape of the conduit means 11.

If desired, a labeling means 111 may be employed for marking the conduit means 11 with the desired trademarks, instructions, or caveats. Such labelers are conventional and need not be described in detail herein. Ordinarily, they comprise one or more lower wheels 112 having the desired marking which are disposed contiguous the conduit means 11 and contiguous a suitable inking means such as rotor 113.

The continuously moving conduit means 11 is then cut into sections of the desired length by the square cutting means 45. The square cutting means 45 may comprise any means that will effect a square cut. For example, it may comprise a laser beam that severs the conduit, the laser source being movable with the conduit to effect the square cut. As illustrated, the square cutting means is similar to those employed in the extrusion of single passageway conduit and need not be described in complete detail herein. Such square cutting means include the complete electrical system including motor starter with thermal overload protection and limit switch actuation of the cutting cycle. Suitable accessories such as special acoustical sound absorption equipment may be employed to meet Department of Labor environment noise standards if desired. A brief description of the operation of the square cutting means 45 is believed instructive, however. Specifically, the conduit means 11 proceeds along a lineal assembly line; such as, track means defined by a plurality of support means 114; to contact a limit switch 115. The limit switch 115 is electrically connected with the square cutting means 45, as at a solenoid valve 117. The square cutting means 45 has an upper section 119 that carries a saw means 121 and is reciprocally movable, as by wheeled carriage 123. The upper section 119 also has a resilient gripping means 125 for gripping the conduit means 11 in response to downward movement of an "over radial" arm 127. The over radial arm 127 is pivotally mounted on one end and connected, at its other end to a suitable power means such as ram 129. The ram 129 is responsive to flow of a motive fluid via solenoid valve 117 to move the free end downwardly and clamp the resilient gripping means 125 against the moving conduit means 11. Thereafter, the upper section 119 including the saw means 121 will move along the lineal assembly line concomitantly with the conduit means 11. Accordingly, the saw means 121 is connected so as to move lineally with the conduit means to effect a square cut as it moves upwardly to make the cut. As illustrated, the saw means 121 is moved upwardly by a pneumatic ram 133 that is connected by a solenoid valve 135 with the limit switch 115 and a source of motive fluid (not shown). Suitable delay may be employed in such an arrangement to effect clamping of the radial arm 127 before the saw means 121 is moved upwardly. Alternatively, the saw means 121 may be moved upwardly in response to the start of movement of the carriage 123 by way of suitable limit switches interposed in the path of the wheels 137. The chips and plastic dust effected by the sawing are drawn off through suitable hose 131 connected with a ventilation fan (not shown). As the saw 121 hits an upper limit switch (not shown) the saw means 121 is returned to its lowermost position; the radial arm 127 is released, and the carriage 123 returned to its starting position. The wheeled carriage may be moved back to its starting position by a suitable drive means or by a slightly inclined track such that the force of gravity effects the return, once the radial arm 127 is released from engaging the conduit means 11.

The cut sections of the conduit means having the plurality of longitudinally extending passageways are then stored for subsequent sale, shipment or use.

The apparatus of FIG. 6 is operable on a 24 hour basis such that, once the extrusion of the conduit means is started, it may be continued indefinitely to meet the desired production schedules.

If desired, a cross head die may be employed for the extrusion of the conduit means 11. The cross head die has a plurality of discrete die heads for extruding a conduit, each conduit having one or more passageways. Thereafter the exterior walls of the conduits are joined; as at contiguous exterior walls; to form a unitary conduit means having the desired plurality of longitudinally extending passageways. For example, a dual cross head die such as illustrated in FIGS. 11 and 12 may be employed to produce a conduit means such as illustrated in FIG. 13. In FIGS. 11 and 12, the die means 31 comprises a first linear die head 141 for producing a first conduit means 143, FIG. 13, having two longitudinally extending passageways 145 and 147. The die means 31 includes a cross head die 149 for extruding a second conduit means 151. The second conduit means 151 comprises seven longitudinally extending passageways arranged in a U-shaped conduit with a horizontal row of three horizontally laterally disposed passageways 153 integrally formed with two rows of vertically disposed passageways 155 and 157. As described hereinbefore with respect to the other die means 31, FIGS. 7–10, each of the first linear die head 141 and the cross head die 149 has a plurality of pin means disposed therewithin for defining the extrusion passageways through which the respective walls of the longitudinally extending passageways and the respective conduit means will be extruded. In the first linear die head 141, the pin means such as pins 159 are held concentrically within the walls of the die head by strong spiders such as formed by a plurality of webs 161. The webs must be sufficiently strong to retain the pins in piace against the relatively high force effected by the plastic under its high pressure acting over the area of the pins.

In addition, the top and bottom webs have the plurality of passageways defined by the respective conduits 75, 77, and 79, as described with respect to FIGS. 9 and 10 for flow of cooling fluid through the respective pin means. This arrangement is similar to the concentric pin means that is retained within a die for the extrusion of single passageway conduit means in conventional practice.

The cross head die 149, similarly, has the respective passageways and conduit means for the cooling fluid, illustrated as conduits 75, 77, and 79. Whereas the lineal die head 141 has an aligned inlet passageway 163 for entry of the molten plastic under high pressure, the cross head die has an inlet passageway 165 that is disposed at an angle with respect to its pin means such as pin 167. Moreover, the inlet passageway 165 divides and, as illustrated by the passageways filled with plastic 169 and 171, FIG. 12, the distribution of the plastic is facilitated by enlarged passageways down the side of the pin means, as well as through vertical and horizontal passageways 173, 175; similar to the passageways 69 and 71 of FIGS. 7 and 8.

As the respective first and second conduit means 143 and 151 are extruded from their respective die heads in molten form, their contiguous outer walls join to form a nine-passageway conduit means, illustrated in FIG. 13. Specifically, the respective first and second conduit means will have their contiguous walls joined, if not already joined by suitably disposed extrusion angles, by entry into a vacuum cooling and sizing means 41. The cooling and sizing means 41 comprises a chilled water bath having a limited inlet via restricted inlet valve 177 and a controlled effluent via vacuum regulator 179 connected with suitable vacuum pump means (not shown) and responsively connected with the interior of the cooling and sizing means 41 for sensing the partial vacuum; and includes the plate support means 93 for sizing the conduit means 11. Thus, the higher pressure in the plurality of longitudinally extending passageways of the conduit means 11 force the contiguous walls of the two conduits 143 and 151 together to form the resulting unitary conduit means 11. Of course, suitable vacuum gauges may be employed on the respective cooling and sizing means 41 for observance by the operator. The respective pin means have suitable stingers 59 for supporting the interior walls that are subject to distortion under the force of gravity while in a deformable state. These walls are cooled rapidly to resist such distortion.

Any or the other forms of the conduit means 11 may be formed by similar dual cross head dies. For example, as illustrated in FIG. 14, a conduit means having fourteen longitudinally extending passageways 17 may be formed by a first conduit means 181 of substantially square cross sectional shape and a second conduit means 183; and emplacing contiguous exterior walls together while in a molten state.

While the cooling and sizing means 41 has been illustrated as being completely filled with a chilled cooling fluid in FIG. 11, it should be realized that where the longitudinally extending passageways are of considerable size; for example, 2–4 inches or more; the bouyant force acting on the total conduit means 11 may be sufficiently great as to be objectionable. Accordingly, a chilled spray with suitable vacuum controls, as illustrated in FIG. 6, will be preferable for the larger sized conduit means.

In the embodiments of the method and apparatus employed for forming the conduit means hereinbefore, the evacuated cooling and sizing means has been employed with substantially atmospheric pressure on the interior of the respective longitudinally extending passageways. If desired, different pressures may be employed in respective vertically disposed, longitudinally extending passageways, as illustrated in FIG. 15, to prevent distortion of the interior walls. As illustrated in FIG. 15, the hot extrudate forming conduit means 11 is extruded from the extrusion passageways of the die means 31 and passed through the cooling and sizing means 41. The cooling and sizing means 41 has the usual accoutrements as described hereinbefore. Additionally, disposed interiorly of the respective longitudinally extending passageways are plugs 185, 187, and 189. The plugs are connected with their respective pin means by suitable cables 191. Respective super atmospheric pressures $P_1$, $P_2$, and $P_3$ are developed in the longitudinally extending passageways such that the pressure $P_1$ is greater than the pressure $P_2$ which is, in turn, greater than the pressure $P_3$ so as to effect an upward force on the interior walls of the respective passageways and prevent the sagging of the interior walls under the force of gravity. The cooling and sizing means 41 may be evacuated, or the pressures $P_1$–$P_3$ may be super atmospheric to force the exterior walls of the conduit 11 outwardly against the support plate means 95. With the method and arrangement illustrated in FIG. 15, the use of the stingers on the respective pin means is no longer necessary. Ordinarily, however, the stinger means will be preferred because care must be taken in emplacing the plugs within the respective conduit means to start the formation of the conduit means 11. Once the plugs are emplaced, the extrusion may be continued on a 24 hour per day basis to minimize the start up difficulties. No vacuum controls are shown on the cooling and sizing means 41 in FIG. 15, since if pressures $P_1$–$P_3$ are sufficiently great, an evacuated cooling and sizing means 41 is unnecessary.

To facilitate use of the conduit means having the plurality of longitudinally extending passageways it is imperative that suitable elbows, or sweeps, be fashioned therefrom to enable making a desired degree of turn and that suitable means be provided for joining the long sections of conduit together; even though there is much less joining to be done than with the short, four foot concrete sections such as were formerly employed.

The bending of the conduit means may be performed with minimal distortion of the respective passageways in a method and with apparatus illustrated in FIG. 16. As will become more clearly apparent from the descriptive matter hereinafter, the method of forming the elbows having the plurality of passageways therewithin comprise the following steps. First, a joint of a predetermined length or a conduit means having a plurality of passageways is formed. Second, a semi-flexible mandrel is emplaced within each of the plurality of passageways of the joint of the conduit means. The semi-flexible mandrel comprises a high melting material and is sufficiently flexible to resist distortion of the passageways when the conduit means is bent. Third, the joint of the conduit means is heated to its softening point along a length where it is to be bent. Fourth, the joint of the conduit means and the semi-flexible mandrels are then bent to the desired degree of bend. Fifth, the joint of the conduit means and the semi-flexible mandrels are cooled while they are retained at the desired degree of bend. Finally, the semi-flexible mandrels are removed from the precisely formed elbow.

As illustrated in FIG. 16, the conduit means 11 is held within a stationary clamp 193 and a movable clamp 195. The semi-flexible mandrel comprises a bag 197 filled with a particulate material such as sand 199 having a high melting point. The bag 197, similarly, has a high melting point and will be formed from suitable high temperature material such as the fluorocarbons like Teflon. The open ends 201 are suitably fastened together to retain the particulate material within the filled bags 197. If desired, the bags defining the semi-flexible mandrel in the passageways on the outside of the turn, away from the interior jug means 203, may be longer than those in the conduits on the inside of the turn in the elbow. The moveable clamp 195 is connected, as by rod 205 with a suitable power means such as a pneumatic ram (not shown) for moving the movable clamp 195 along a defined arc to achieve the exact degree of bend for the elbow. The exact degree of bend may be adjusted by suitable movable stops in conformance with the interior jig 203, as described in my co-pending application Ser. No. 127,931, entitled "Precision Bending of Plastic Pipe", filed Mar. 25, 1971; now issued as U.S. Pat. No. 3,753,635. The suitable contol means, and the guides for the movable clamp are described in detail therein and need not be repeated in this application. The heating may be effected by any means such as infrared lamps, electrical elements, or even radio freguency (RF) heating. In the latter instance, the silicate particles, if sand is employed, may respond to the RF heating to heat the conduit means interiorly for faster heating. Thus, the radio frequency heating may be employed alone or a supplemental means in conjunction with another mode of heating.

After the desired degree of bend has been achieved, the conduit means is cooled, as by spraying chilled fluid such as water thereover. If desired, the bending operation may be automated, as described in my above referenced application Ser. No. 127,931. Once the precision elbow has been formed, the clamps 193 and 195 are released and the elbow removed from the bending apparatus. The semi-flexible mandrels may be removed; directly, or by opening the end 201 to release the particulate matter therefrom to facilitate removal of the bags 197. With these precisely formed elbows, the sections of the pipe may be readily joined to turn any degree of bend readily and much more expeditiously than was formerly required with either the short sections of concrete conduit or the bundled sections of single conduit.

The respective sections may be joined together by any conventional means. For example, if desired, one end of a conduit may be belled by heating and the insertion of a belling means during the manufacture of the conduit; while the other end of the conduit is formed into an insert end that fits conformingly within the belled end, by the use of a suitable heated mold to form the exact shaped insert end. Such joining of insert end to belled end, in conjunction with suitable compatible adhesives, will effect a joint that is sufficiently tight that even poisonous gases may be flowed through the respective conduit means. For example, polyvinyl chloride has its own commercially available adhesive systems, as does ABS. The polyolefinic thermoplastic materials do not have a satisfactory adhesive system. Consequently, if the sections of the conduit means are formed of the polyolefins, they must be joined by heat. For example, it is known to embed wires in one end of the conduit means such that, when abutted with an adjacent end of an adjacent section and the wires heated electrically, the plastic is melted to form a fluid tight joint between the sections.

Preferably, however, joining of the respective conduit sections is effected by the use of a coupling means such as illustrated in FIG. 17. Therein, the coupling means 211 comprises an exterior shell 212 having two receiving ends. Each receiving end of the coupling means 211 will have a slight taper 213 within the range of from about ½° to 1½° per inch to define a lead-in for the conduit means. If desired, the squared off ends of the respective sections of the conduit means may be inserted within an exact replica for forming a conforming insert end on the respective sections. In this way, the sections of the conduit means will fit within the coupling means 211, with or without additional bonding such as the adhesive system, or the heating. Ordinarily, it is not imperative that each of the interior longitudinally extending passageways be sealed from each other, but only that the exterior walls of the conduit be sealed so as to maintain a positive pressure; such as, a positive nitrogen pressure in the case of telephonic installations. Thus the ends of the sections of the conduit means 11 may be abutted without requiring an intermediate sealing means, or grid. As illustrated in FIG. 17, however, the coupling means 211 has a centrally disposed grid 215 for abutting each end of the respective sections of conduit, as illustrated in FIG. 18. The grid means 215 abuts the respective interior walls of the respective longitudinally extending passageways to form a seal therewith. If desired, o-rings or similar resilient materials may be incorporated into the respective ends of the grid means 215 to better effect a seal with the respective interior walls of the conduit means 11. It is for effecting a close fit that the pipe ends must be exactly "squared," or out perpendicular to the longitudinal axis by the square cutting means 45.

The coupling means 211 may be formed by any of the well known precesses such as by rotational casting, described in my U.S. Pat. Nos. 3,314,639; 3,315,314; 3,341,896; and 3,388,429. The shrinkage factors, as well as the mechanical devices for effecting the desired taper and "sizing" of both the coupling means 211 and the ends of the conduit sections are known in the plastic art and need not be described in detail herein. The butt joints so formed are nearly enough perfect to prevent snagging of cable or turbulence of materials flowing through the respective longitudinally extending passageways.

The coupling means 211 may be formed by injection molding if desired.

From the foregoing descriptive matter and drawings, it can be seen that this invention accomplishes several desirable things. The conduit means having the plurality of longitudinally extending passageways having common interior walls will eliminate much of plastic in pipe and thereby make an economical conduit means. The manufacture of this type conduit means, with its long lengths is advantageous, instead of either employing the short length of concrete or requiring labor and manpower for individually bundling a plurality of single conduits together by banding, strapping, welding, or glueing. Moreover, the long lengths of conduit means having the plurality of longitudinally extending passageways will allow an installation crew to handle as long a length as has been employed with a single passageway conduit heretofore, with obvious savings in the installation costs. The coupling of the conduit means having the plurality of longitudinally extending passageways is much more economical than the coupling of respective ends of a plurality of individual tubes in a bundle, requiring, as it does, a different radius of curvature for each elbow, even though the same degree of turn is being effected by the respective pipe iin the bundle. Further savings are effected and better and more nearly standard degrees of turn can be effected readily. Thus, the invention obviates the disadvantages of the prior art and provides a substantially universally acceptable conduit means with a plurality of passageways; a method of employing it, including method of bending and joining; and method and apparatus for its manufacture.

Although the invention has been described with a certain degree of particularity, it is understood that the present disclosure is made only by way of example and that numerous changes in the details of construction and the combination and arrangement of parts may be resorted to without departing from the spirit and the scope of the invention.

I claim:

1. Apparatus for forming conduit means having exterior walls around a plurality of passageways extending longitudinally therewithin comprising:
   a. blender and extruder means for effecting extrusion of said conduit as a single, continuous, hot extrudate, and having:
      i. hopper means for receiving a raw feed comprising plastic;
      ii. plasticizer means connected with said hopper means for converting said raw feed into a viscous molten mass and for forcing said viscous molten mass through a die means under high differential pressure thereacross; and
      iii. die means connected with said plasticizer means for converting said molten mass into said hot extrudate; said die means having a plurality of adjacent pin means that include at least one pin means that is surrounded by adjacent pin means so as to define at least one interior passageway that is totally surrounded by interior walls that cannot be cooled by an external coolant and that, consequently, are subject to sagging; said plurality of adjacent pin means being spaced apart so as to define a continuous extrusion passageway around each said pin means so as to form said hot extrudate into said conduit that is continuous and closed in cross section and that defines said plurality of longitudinally extending passageways, each passageway having at least a portion of its internal walls in common with an adjacent passageway, said pin means being elongated and having parallel and connected cooling passageways disposed interiorly therewithin and extending longitudinally therealong for flowing a cooling fluid into and out of said pin means for cooling and supporting walls of said hot extrudate to prevent intolerable sagging, said pin means also having a second cooling passageway extending longitudinally therethrough for passage of cooling and pressurizing fluid into said longitudinally extending passageways of said hot extrudate for supporting walls thereof to prevent sagging;
   b. cooling, sizing and vacuum chamber means for cooling said hot extrudate while simultaneously effecting a reduced pressure on the exterior thereof; said cooling, sizing and vacuum chamber means including:
      i. cooling fluid aperture means for admitting a cooling fluid into said cooling, sizing and vacuum chamber means onto the exterior of said hot extrudate;
      ii. vacuum producing means for exhausting said cooling fluid and effecting a predetermined reduced pressure within said cooling, sizing and vacuum chamber means that is less than the pressure within said hot extrudate, whereby the walls of said hot extrudate are urged outwardly in operation; and iii. support means for sizing and preventing distortion of the pliable walls of said hot extrudate under the force of gravity and the differential pressure from the interior to the exterior thereof until the extrudate is cooled to a non-pliable state so as to resist and distortion;

c. pulling means disposed downstream of and lineally along the longitudinal axis of said cooling, sizing and vacuum chamber means and when operational of said extrudate, for moving said hot extrudate away from said die means, said pulling means being adapted for engaging the self-supporting exterior walls of said extrudate;

d. track means comprising a plurality of lineally aligned support means for supporting the non-pliable extrudate; and e. square cutting means for effecting a square cut of the multi-passageway conduit formed by said extrudate; said square cutting means including:

i. a table means that is reciprocally moveable longitudinally of said conduit and carrying a cutting blade and power means that is reciprocally movable perpendicularly of said conduit; and ii. attachment means connected with said table means and with a length measuring means and adapted to releasably connect said conduit means and said movable table means for temporarily effecting concomitant movement thereof.

2. The apparatus of claim 1 wherein said cooling, sizing and vacuum chamber means is short so as to merely cool said hot extrudate to a non-pliable state that is resistant to distortion and a cooling chamber is disposed downstream of an lineally along the longitudinal axis of said cooling, sizing and vacuum chamber means, and when operational of said extrudate, for further cooling of the non-pilable extrudate into said conduit means.

3. The apparatus of claim 1 wherein said support means within said cooling, sizing and vacuum chamber means comprise longitudinally extending plates conforming to the size and shape of the exterior walls of said conduit means.

4. The apparatus of claim 3 wherein stinger means extend longitudinally from said pin means beneath the interior walls of said hot extrudate for support thereof.

5. The apparatus of claim 4 wherein said die means includes at least nine pin means and said stinger means have cooling fluid passageways traversing longitudinally therewithin for being cooled and in turn, cooling the supported said interior walls.

6. The apparatus of claim 5 wherein said die means includes nine pin means comprising eight pin means disposed about a central pin means; and six stinger means are provided for supporting the interior walls of said hot extrudate.

7. The apparatus of claim 5 wherein said die means includes 12 pin means and 9 stinger means are provided for supporting said interior walls of said hot extrudate.

* * * * *